E. A. HEMSTEGER.
NUT LOCK.
APPLICATION FILED APR. 2, 1909.
962,347.
Patented June 21, 1910.
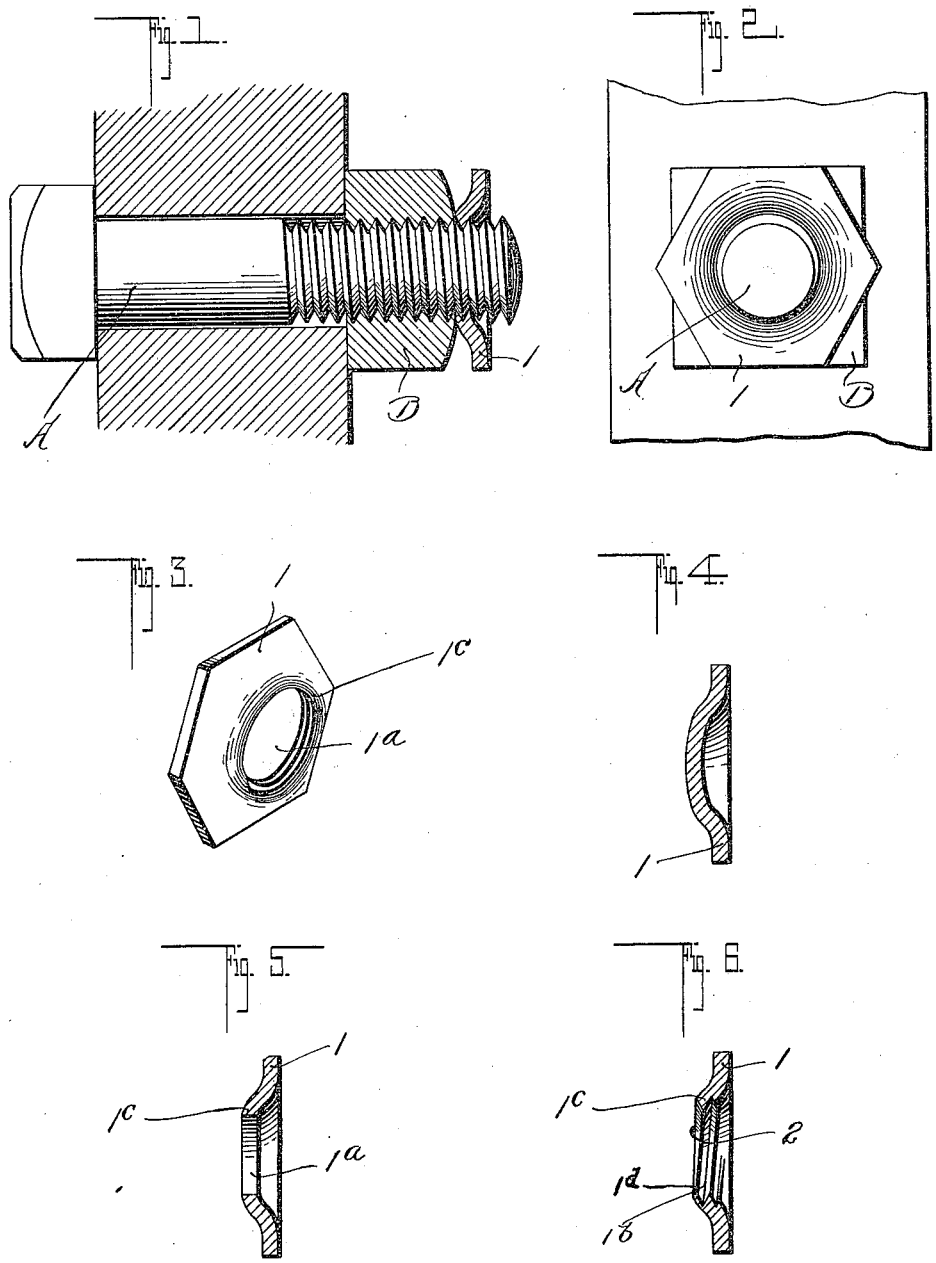
Witnesses
Philip H. Burch
S. E. Dodge
Inventor
E. A. Hemsteger,
By Beeler & Robb
Attorneys

UNITED STATES PATENT OFFICE.

EDWARD A. HEMSTEGER, OF CHICAGO, ILLINOIS, ASSIGNOR TO WEISELL NUT LOCK COMPANY, OF CHICAGO, ILLINOIS, A CORPORATION OF SOUTH DAKOTA.

NUT-LOCK.

962,347.   Specification of Letters Patent.   Patented June 21, 1910.

Application filed April 2, 1909. Serial No. 487,437.

*To all whom it may concern:*

Be it known that I, EDWARD A. HEMSTEGER, a citizen of the United States, residing at Chicago, in the county of Cook and State of Illinois, have invented certain new and useful Improvements in Nut-Locks, of which the following is a specification.

This invention embodies an improved form of nut lock of the type described in my Letters Patent #901,810, issued October 20, 1908.

In my patent above referred to the nut locking device described includes a peculiar form of nut in which the outer end of the threaded opening is chamfered. In my present invention I have found that by utilizing a nut lock similar to that in my prior patent, but constructing the body of the lock nut and its locking threads in a different manner, I am able to dispense with the chamfering of the holding nut, a feature highly advantageous in conducing to the cheapness and practicality of my nut locking means.

For a full understanding of the invention, reference is to be had to the following detail description and to the accompanying drawings, in which—

Figure 1 is a longitudinal sectional view of a bolt having an ordinary nut thereon locked by means of my device; Fig. 2 is an end view of the same; Fig. 3 is a detail perspective view of my lock nut alone, and Figs. 4, 5, and 6, are vertical sectional views showing clearly the respective steps in the process of manufacturing my lock nut from a sheet metal blank.

Throughout the following detail description, and on the several figures of the drawings similar parts are referred to by like reference characters.

In the drawings the bolt is designated as A and is threaded in the customary way to receive the holding nut B, the latter being an ordinary form of nut such as is commonly in use today for various purposes. My lock nut 1 is of hexagonal form, or of many sided construction, and is preferably made from a flat piece of metal subjected to pressure of suitable dies so as to provide a concavo-convex central portion, an opening $1^a$ being cut in said central portion, as shown in Fig. 5, and the final step in making the lock nut being to tap the opening to provide the threads $1^b$ shown in Fig. 6. The threads $1^b$ are so formed as to give use to a locking action different from that of the lock nut of my former patent. As shown in Fig. 3 the central portion of the lock nut 1 protrudes laterally from the flat body of the nut forming a circular flange $1^c$ and the threaded portion of the opening $1^a$ begins at the point of the mark $1^d$. Necessarily the thread $1^b$ is very sharp or pointed at its beginning, increasing of course in size toward the outer side of the nut 1.

It is the above construction that is of particular advantage in the practical embodiment of this invention because in the actual use of the invention, after the holding nut has been screwed against the work, the nut 1 is screwed into place against the outer side of the nut B. When force is exerted by a suitable tool to move the nut 1 hard against the nut B the thread $1^b$ of the nut 1 enters the head of the nut B and is forced on down the thread of the bolt, the increasing thickness of the thread of the nut 1 from its beginning $1^d$, tending to exert a great pressure against the thread of the bolt both outwardly and inwardly. In other words, the thread of the member 1 might be termed to have a circular or rotating wedging action as it enters into engagement between the threads of the bolt and the holding nut B, and in the above action it is apparent that the thread of the nut lock 1 is confined in the space encompassed by the threads of the parts A and B and is crushed to fill absolutely all of such space greatly promoting the wedging action thereof and preventing likelihood of displacement of the nut B without previous removal of the lock nut 1.

It will be observed that the locking thread $1^b$ of the nut 1, with the flange in which it is formed, is off-set with respect to and thus practically spaced from the plane of the body of the nut. By reason of this structure should there be a tendency on the part of the holding nut B to unscrew, the wedging action of the thread $1^b$ comes into immediate play, in coöperation with the threads of the bolt A and the nut B, to resist the displacement of the latter. There is no frictional contact between the nut B and the body of the lock nut 1, and which would tend to cause the two nuts to unscrew simultaneously. In the locking action of my device the only coöperation between the lock nut and the holding nut is the thread-to-thread wedging action hereinbefore described.

While in my former patent I utilized the principle of having a thread engaging flange, broadly speaking, said flange does not engage the thread of the holding nut, and furthermore the circular wedge member formed by the peculiar construction of the thread 1$^b$ in my present lock nut was not employed in the previous construction. It is by reason of this peculiar formation of the threaded central flanged part 1$^c$ of my nut lock 1 that I am able to dispense with all chamfering of the holding nut B eliminating an item of expense rendering my improvement of great advantage over my former device.

My present nut lock employs the principle of having a thread to thread locking or wedging action and it is to be borne in mind that the thread of the lock nut has this wedging action in respect to the threads of both the bolt and the holding nut.

Having thus described the invention, what is claimed as new is:

1. In combination, a threaded bolt, a holding nut screwed thereon, and a lock nut screwed upon the threaded portion of the bolt against the outer side of the holding nut, said lock-nut being provided with a central flange projecting laterally therefrom and off-set with respect to the body of the nut, and the thread of the lock nut beginning at the outer edge of said flange and increasing in thickness toward the opposite direction, whereby the pointed or sharp end of the thread at its beginning will enter the space between the threads of the bolt and holding nut by a circular or rotary wedging action.

2. In combination, a threaded bolt, a holding nut screwed thereon, and a lock nut consisting of a flat piece of metal having its central portion pressed outwardly to form a circular flange off-set with respect to the body of the nut, the middle portion of the latter nut being provided with an opening tapped with a thread beginning at the outermost edge of the said flange and increasing in thickness toward the opposite direction, the sharp pointed portion of the thread of the lock nut at its beginning being forced between the threads of the bolt and holding nut by rotary movement of the lock nut and thereby affording a circular wedging or locking action.

In testimony whereof I affix my signature in presence of two witnesses.

EDWARD A. HEMSTEGER.

Witnesses:
 EDWIN M. WEISELL,
 W. I. MCCALL.